June 4, 1929.    F. P. CONNORS    1,715,900
RESILIENT VEHICLE WHEEL
Filed July 21, 1927    4 Sheets-Sheet 2

INVENTOR.
Frederick P. Connors
BY Myron J. Dikeman
ATTORNEY.

June 4, 1929.  F. P. CONNORS  1,715,900
RESILIENT VEHICLE WHEEL
Filed July 21, 1927  4 Sheets-Sheet 3
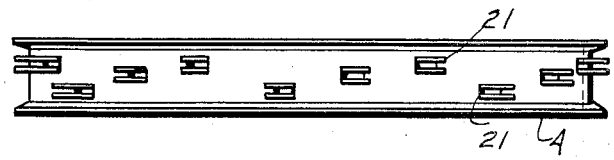
Fig. 6
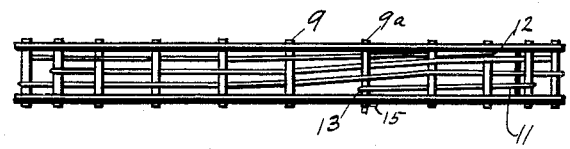
Fig. 7
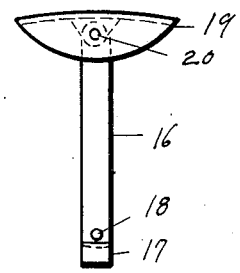 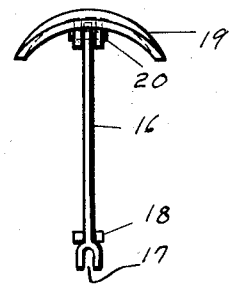
Fig. 8  Fig. 9
 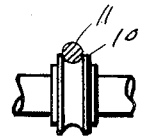
Fig. 10  Fig. 11
INVENTOR.
Frederick P. Connors
BY
Myron J. Dikeman
ATTORNEY.

June 4, 1929.  F. P. CONNORS  1,715,900
RESILIENT VEHICLE WHEEL
Filed July 21, 1927   4 Sheets-Sheet 4

INVENTOR.
Frederick P. Connors
BY Myron J. Dikeman
ATTORNEY.

Patented June 4, 1929.

1,715,900

UNITED STATES PATENT OFFICE.

FREDERICK P. CONNORS, OF DETROIT, MICHIGAN.

RESILIENT VEHICLE WHEEL.

Application filed July 21, 1927. Serial No. 207,347.

The object of my invention is to produce a vehicle wheel having a resilient property capable of intercepting road shocks.

Another object is to produce a vehicle wheel of a structure that will possess the properties of a pneumatic tired wheel and afford great resilience to intercept the shocks.

A further object is to produce a vehicle wheel that will produce the effect of a pneumatic tired wheel and present the general appearance of the pneumatic tire construction such as would be applicable to use on automobile vehicles.

A still further object is to produce a resilient vehicle wheel operating under stress of high tension spring wires in such a manner as to afford resilience of the tire member and that will produce a wholly puncture-proof tire.

These several objects are attained in the preferred form by the structure, construction and arrangement of parts as is more fully hereinafter set forth.

Similar parts on all drawings are marked by similar numerals.

Fig. 6 shows an outside view of the vehicle rim illustrating the position of the riders and the slide frames mounted for holding the riders in alignment.

Fig. 7 is an outside view of the edge of the vehicle felloe, illustrating one means of winding the resilient wires thereon.

Fig. 8 is a side view of an enlarged detail of a rider and tire pad.

Fig. 9 is an edge view of the rider shown in Fig. 8, showing the means of attaching and wire connections.

Fig. 10 illustrates a friction roller to be mounted on the pins shown in Fig. 7 for supporting the resilient wires and avoiding friction on the supporting pins.

Fig. 11 is an edge view of the roller shown in Fig. 10, with a resilient wire mounted therein, and the roller mounted on the supporting pin.

Figure 1:
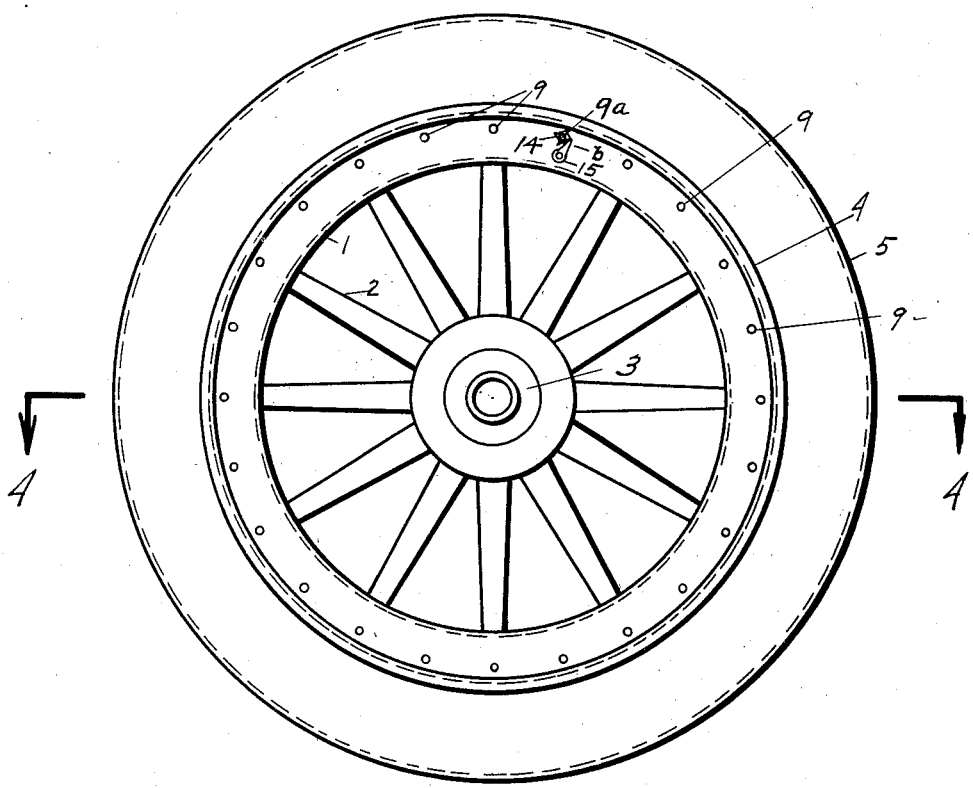
Fig. 1 shows a side view of the assembled vehicle wheel completely closed and sealed ready for vehicle installation.
Figure 2:
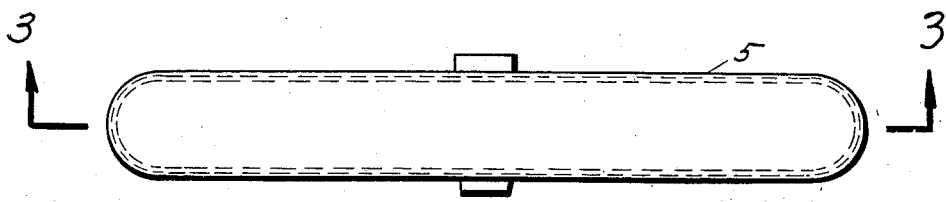
Fig. 2 is an edge view of the wheel shown in Fig. 1.

I will now describe more fully the detail construction of my device, referring to the drawings and the marks thereon.

My device comprises in general a series of high tension wires mounted within the felloe of the wheel at various points of support and stressed to high tension. Tire riders mounted within the wheel rim engage the resilient wires in a manner for stressing same as the load is applied to the rim of the wheel or tire in the ordinary manner. The load is transmitted through the rider directly into the spring wire sections of the felloe and provides wheel resilience in the same manner as the ordinary pneumatic tired wheel. While I have illustrated my device as applied to a wheel designed more specifically to illustrate a wheel used on the automobile vehicle, it is apparent that by various slight modifications the wheel may be transformed into any type of vehicle wheel, by the use and application of a rubber or flexible tire casing.

Figure 3:
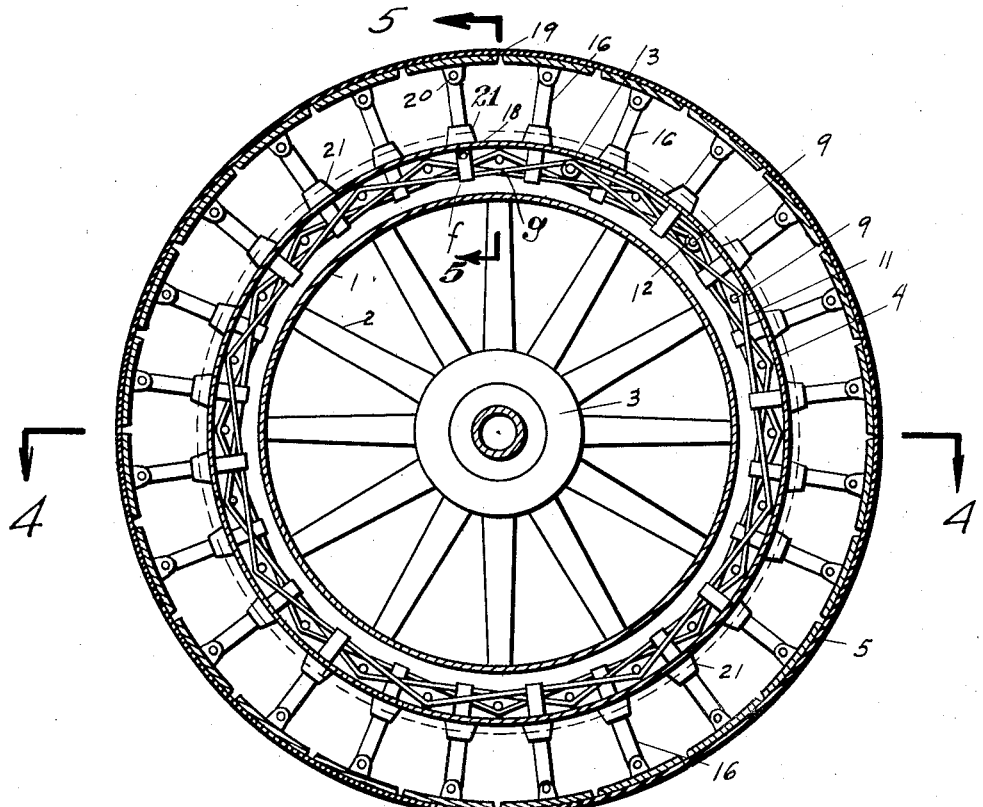
Fig. 3 is a sectional view taken on line 3—3 of Fig. 2, showing the general construction ad arrangement of the mechanical parts and resilient wires mounted within the vehicle felloe.
Figure 4:
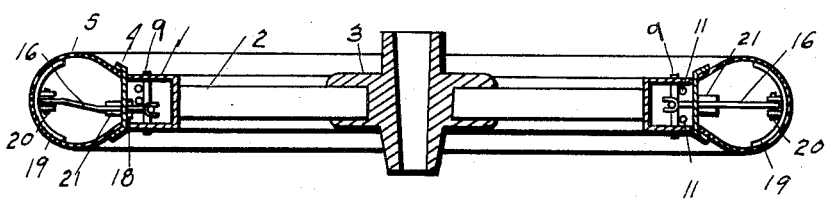
Fig. 4 is a sectional view taken on line 4—4 of Fig. 1, showing the relative position of the resilient springs and the connecting parts.
Figure 5:
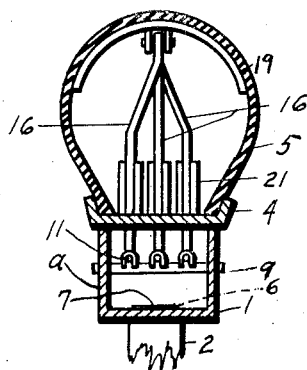
Fig. 5 is an enlarged diagrammatic illustration as would appear on line 5—5 of Fig. 3, if the riders on the resilient wires were placed consecutively in the same plane. It further illustrates the application of my principle should several riders be attached at one point for engaging more than one resilient wire at a time.
Figure 12:
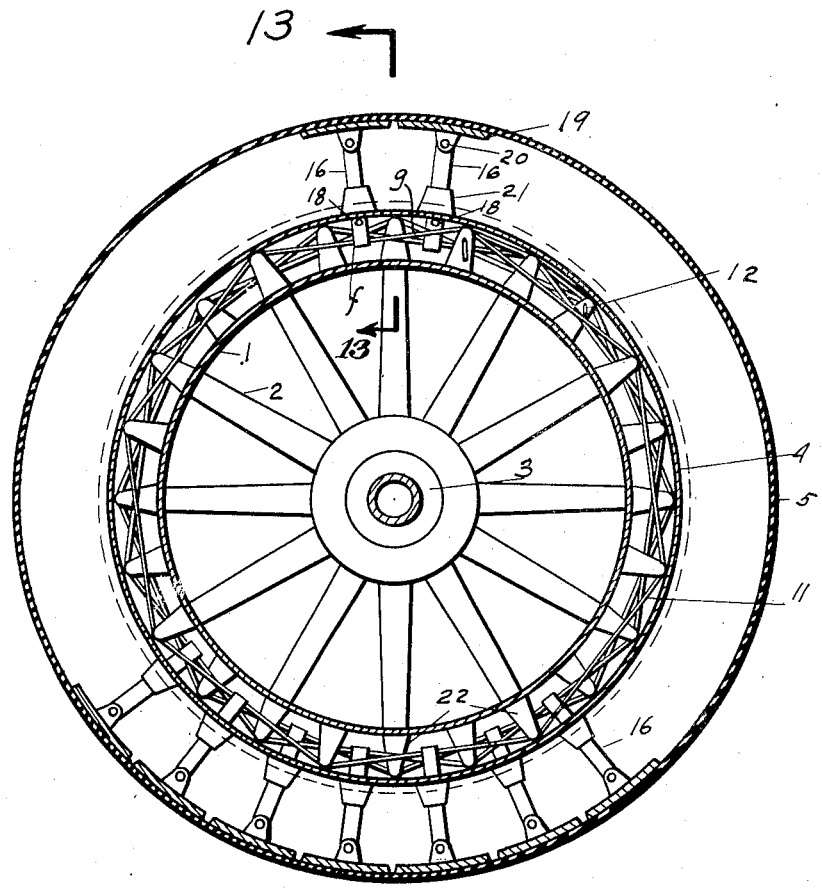
Fig. 12 is a similar sectional view to that taken on line 3—3 of Fig. 2, showing an alternate form of resilient wire supports, substituting stool supports for the felloe pins. The balance of the wheel is the same as that shown in Fig. 3.
Figures 13, 14, 15:
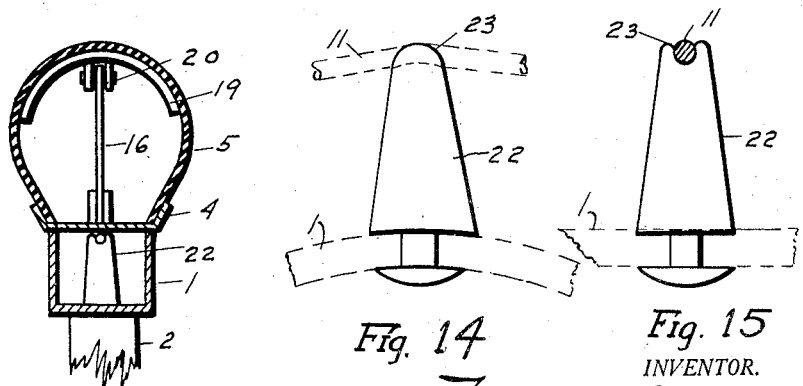
Fig. 13 is a sectional view taken on line 13—13 of Fig. 12, showing the application of the metal rider and resilient wire as applied to the metal felloe stool.
Fig. 14 is a side view of an enlarged detail of the felloe stool shown in Fig. 12.
Fig. 15 is an edge view of the felloe stool shown in Fig. 14, showing the means for engaging and holding a resilient wire therein.

The wheel comprises the felloe —1—, mounted on suitable spokes —2— and hub —3— in a manner ordinarily applied to wheel construction, and also carries mounted thereon the rim —4— attached thereto in a manner ordinarily employed for attaching wheel rims to fellies. On the outside of the rim —4— is mounted the tire casing —5— and is illustrated in this device as a combination fabric and rubber tire similar to that of the ordinary casing employed in pneumatic tires. The felloe —1— is made of pressed sheet metal preferably of a rectangular cross-section as illustrated in Fig. 5, and is provided with circumferential recesses —6— at uniform intervals around the inside circumference for receiving the tenons —7— of the wheel spokes —2— forming a rigid wheel construction thereby. At uniform intervals around the outer edges of the side walls —a— of the felloe —1— are mounted bearing pins —9—. The bearing pins —9— extend through both walls of the felloe and are tightly pressed therein to prevent turning or moving of the pin. Each pin —9— is provided with a groove in the circumference thereof for receiving a resilient wire therein to hold the wire in a pre-determined position, or it may be provided with a special roller —10— as shown in Fig. 11 for holding the wire in position and also relieving wire friction on the bearing pin. Around the outside of the bearing pins —9— are wound the resilient wires —11—. The resilient wire —11— is preferably made of a high grade spring steel, capable of offering great tensile resistance and of a similar wire to that known as "piano" wire. The resilient wires —11— are strung over bearing pins —9— at uniform intervals preferably engaging the pins in a manner to position sections of resilient wire over successive unsupported spaces and comprise several circumferential windings of wire arranged so that the different strands encircling the wheel will engage different sets of bearing pins, alternating therewith and positioned thereon, to produce a successive and uniform space of unsupported wire sections, capable of receiving the rim load at the center of the unsupported wire sections. The resilient wires —11— may be made of single strands extending around the felloe of the wheel, each separate from the other, or they may be wound on and interwoven with the various bearing pins to represent a continuous wire extending several times around the felloe, all in one piece, as illustrated in Figs. 3 and 12, in which case the end —12— is fixedly attached to one support and the opposite end —13— attached to one of the bearing pins —9ᵃ— in a manner for tightening and stressing the wire thereon. The pin —9ᵃ— is preferably provided with a socket end —b— suitable for engaging a wrench thereon for tightening the wires, which are held in position by the ratchet wheel —14— and pawl —15—. This also provides means for re-stressing the wires at any time necessary. The resilient wires —11— are placed on the bearing pins —9— at a uniform spacing thereon and are illustrated in the drawings with only three wire coils while any number of coils of wire may be employed, depending upon the size of the wheel and the load to be carried. The size and strength of the wire —11— will also be governed by the load which it is to carry. At the center —f— of each unsupported section —g— of the resilient wires —11— is mounted a sliding post rider —16—. The riders —16—, as is more especially illustrated in Figs. 8 and 9, are preferably formed of flat bars having notched recesses —17— formed in one end thereof. The notch —17— is made to fit over and engage the resilient wire —11—. The rider is provided with a bumper —18— formed thereon for engaging the inside rim and preventing the rider from leaving the wire. At the opposite end of the rider —16— is mounted a metal tire pad —19— attached thereto by the pivot —20—. The tire pad —19— is formed to fit the inner surface of the fabric tire —5— when placed therein in consecutive positions around the circumference thereof as shown in Figs. 3 and 12, forming practically a metallic lining for the casing —5— and providing a support for the tire circumference at all points as might come in contact with the road or pavement. The length of the rider post —16— is sufficient to extend over the intervening space between the center of each unsupported section of the resilient wire —11— to the tire pad —19—, sufficient for holding the pad tightly against the tire walls and providing an initial stress within the wire —11— sufficient for supporting an initial, nominal load thereon. The tension in the wires —11— may be adjusted by means of the ratchet and pawl —14— and —15—. Throughout the entire design and construction of this wheel, any load as may be applied to the outer rim of the wheel or tire is communicated directly to the resilient sections of the wire —11—, which, being of an extremely high tensile strength, allows but a slight spring displacement thereon, and the properties of the spring wire will cause it to return to its initial position immediately upon the release of the applied load. The riders —16— are held more firmly in true alignment by the guide plugs —21— mounted on the circumference of the rim —4— and the riders sliding between the slides and through the opening in the rim circumference. The consecutive riders as may be spaced around the wheels engage the centers of the consecutive unsupported sections of resilient wires in a manner as illustrated in the drawings. While I have shown only single riders for the tire pads, each engaging a single resilient wire, more than one rider may be placed at a single point and a series of resilient wires added thereto, as illustrated in Fig. 5, whereby each tire pad would be supported by several riders and several resilient wires instead of a single one as illustrated in Fig. 3, which means might be employed for both stability of the wheel and capacity, for heavy loads.

An alternate form of structure is shown in Figs. 12, 13, 14 and 15, comprising the same type of wheel and general wheel construction except the bearing pins —9— as shown in the former figures are replaced by the felloe stools —22— fixedly attached to the bottom wall of the felloe —1—, and placed therein to support the resilient wires —11— in the same position as when strung on the bearing pins shown in Fig. 3. The successive felloe stools are positioned in a set formation across the face of the felloe as illustrated in Fig. 6 for the rider slides. The outer ends of the felloe stools —22— are provided with a grooved recess —23— for receiving and retaining the wire —11— therein when tightly stretched, and the walls of the groove —23— may be made to allow the wire 11 to slide within the groove during various adjustments of resilient wires under stress or if desired when the wire had once been stressed to an initial tension, the recess walls may be closed and clamped tightly on the wire to more firmly hold the same in its initial stressed position. The wheel operates exactly in the same manner as heretofore described.

Having fully described my resilient vehicle wheel, what I claim as my invention and desire to secure by Letters Patent is:

1. A resilient vehicle wheel adapted for intercepting road shocks when the wheel is subjected to loads, comprising a wheel structure having a hollow felloe mounted thereon, spring wire having high tensile strength mounted within the felloe and supported at intermittent points therein and stressed to pre-determined initial tension, a flexible tire mounted outside of the felloe, rider posts mounted within the said tire and positioned so that each inner end will engage successive sections of resilient wires between supports and be capable of imparting tire pressure thereto in a manner to transmit all road shocks directly to highly stressed resilient felloe wires.

2. A resilient vehicle wheel adapted for intercepting road shocks, comprising a central wheel structure having a hollow metal felloe mounted thereon, fixed supports intermittently spaced around the entire felloe, high tension spring wire mounted on the fixed supports extending around the entire circumference of the felloe in a manner to produce unsupported sections of spring wire between the supports, said wire being drawn to a predetermined initial tension, a wheel tire mounted outside of the said felloe, providing an intervening space therebetween, said tire being constructed of suitable flexible material, rider posts mounted within the said tire and engaging with the outer circumference thereof, each of said rider posts being of a length to extend into the felloe and to engage an unsupported section of the highly stressed resilient wire in a manner that any depression or shock imparted to the said tire will be transmitted directly to the resilient wire for absorbing the shock before reaching the hub of the wheel section.

3. A resilient vehicle wheel adapted for intercepting road shocks, comprising a center wheel structure having a series of intermittently spaced wire supports mounted around the circumference of the wheel, resilient wires mounted on said supports extending around the entire circumference of the wheel in a manner to provide intermittent unsupported sections of wire, said wire being stressed to a pre-determined initial tension, a flexible tire mounted on said wheel outside of the resilient wires, tire pads mounted inside the said tire and supported therein by rider posts, said posts extending to the unsupported sections of the resilient wires and being capable of transmitting any shocks or tire depressions directly to the resilient wires in a manner for intercepting shock before it reaches the center of the vehicle wheel.

4. A resilient vehicle wheel adapted for intercepting road shocks, comprising a center wheel structure having a hollow metal felloe mounted thereon, wire supports mounted within the felloe and placed therein at uniform intervals, spring wire of high tensile strength wound thereon over said supports, encircling the felloe one or more times and providing intermittent unsupported wire sections between the wire supports, said spring wire being drawn to a pre-determined initial tension within the felloe, a wheel rim mounted outside the felloe having rider posts slidably mounted therein, each of said rider posts engaging one of the wire sections between the wire supports, tire pads mounted on the outer ends of said rider posts, and a flexible tire mounted on the said rim for inclosing said tire pads and rider posts, said rider posts being of a length to engage the spring wire sections and hold the tire pads against the outer tire circumference with sufficient pressure to produce a strong resilient wheel.

In witness whereof I sign these specifications.

FREDERICK P. CONNORS.